United States Patent [19]

Oshida

[11] Patent Number: 4,614,004
[45] Date of Patent: Sep. 30, 1986

[54] OIL FILLED ROTARY DAMPER HAVING A SYMMETRICALLY SHAPED FLEXIBLE MEMBRANE

[75] Inventor: Tsutomu Oshida, Tokyo, Japan

[73] Assignee: Nifco Inc., Yokohama, Japan

[21] Appl. No.: 667,235

[22] Filed: Nov. 1, 1984

[30] Foreign Application Priority Data

Nov. 7, 1983 [JP] Japan .............................. 58-171298[U]

[51] Int. Cl.[4] ............................................. E05F 5/02
[52] U.S. Cl. ........................................ 16/82; 188/290
[58] Field of Search .................. 16/82, 84, DIG. 9; 188/130, 290

[56] References Cited

U.S. PATENT DOCUMENTS

| 3,952,365 | 4/1976 | Grisebach | 16/82 X |
| 4,426,752 | 1/1984 | Nakayama | 16/82 |
| 4,497,393 | 2/1985 | Brems | 188/290 X |

FOREIGN PATENT DOCUMENTS

| 55-75805 | 5/1980 | Japan | 16/82 |
| 58-189843 | 12/1983 | Japan . | |
| 59-88548 | 6/1984 | Japan . | |
| 59-101027 | 7/1984 | Japan . | |
| 59-100128 | 7/1984 | Japan . | |
| 2080602 | 2/1982 | United Kingdom | 16/82 |

*Primary Examiner*—Fred Silverberg
*Attorney, Agent, or Firm*—Trexler, Bushnell & Wolters, Ltd.

[57] ABSTRACT

An oil type damper for braking and absorbing the opening-closing motion of a lid in a cassette tape recorder, video recorder or the like is improved by incorporating therein a flexible membrane formed in a structure symmetrical with respect to the obverse and reverse sides thereof, interposed between a housing and a braking disk, and adapted to absorb thermal expansion of oil and produce a sealing effect and, at the same time, causing the shaft projected from the braking disk for supporting the flexible membrane in place to contain a flared base radially diverged downwardly. Since the flexible membrane has a structure symmetrical with respect to the obverse and reverse sides thereof, the possibility of incorrect assembly of the oil type damper is minimized and the operational efficiency of damper production is increased without sacrificing sealing effect.

5 Claims, 4 Drawing Figures

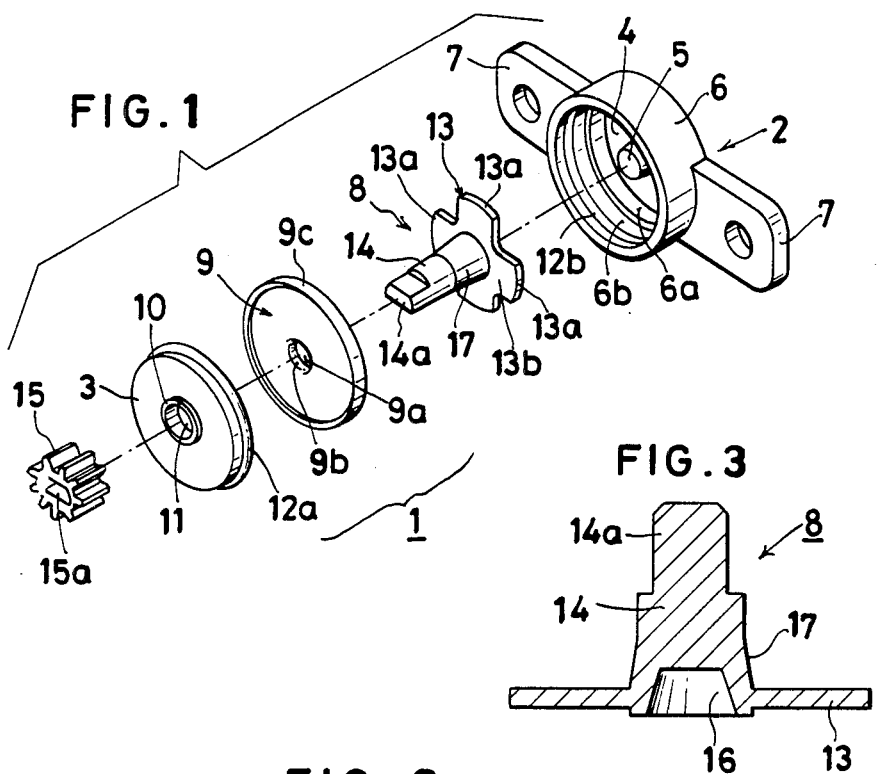
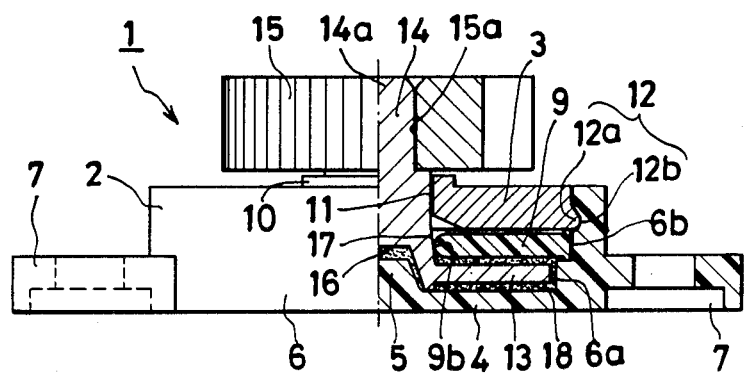
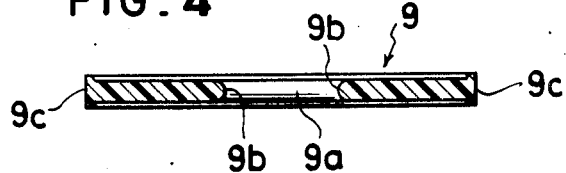

4,614,004

OIL FILLED ROTARY DAMPER HAVING A SYMMETRICALLY SHAPED FLEXIBLE MEMBRANE

FIELD OF THE INVENTION

This invention relates to an oil type damper for braking and absorbing the opening-closing motion of a freely openable-closable lid or the like of the type used in various devices such as the cassette tape recorder, and more particularly to improvements in and concerning the oil type damper which contains oil to fill up a gap left within a housing incorporating a rotor as disposed freely rotatably therein and which, by virtue of the resistance generated by the viscosity of the oil, controls the rotation of the rotor and consequently the rotation of the lid or the like.

BACKGROUND OF THE INVENTION

Electric appliances such as cassette tape recorders, video recorders, and compact disk players are provided with an open-close type holder or lid for permitting insertion of a recording medium. When the holder in such an electric appliance is opened or closed with the force of a spring, for example, it generates resilient motion entailing vibration and impact. Since the vibration and impact exert adverse effects on the appliance, the appliance has to be provided with a damper to protect it from such adverse effects.

There are dampers of various types. Among these, the rotary damper which derives its damping effect from the viscosity of oil has found popular acceptance because it remains functional for a long time and excels in durability.

Dampers of this type have been disclosed in Japanese Utility Model Public Disclosures SHO 59(1984)-88548, SHO 59(1984)-101027, and SHO 59(1984)-100128, and U.S. Pat. No. 4,342,135 for example.

The oil type damper proposed by Japanese Utility Model Public Disclosure SHO 58(1983)-189843 has overcome the disadvantage of oil leakage inherent in the conventional damper by incorporating in the housing a soft flexible membrane rich in elasticity in addition to the rotor and causing this flexible membrane to absorb the thermal expansion of oil and prevent the oil from leaking out of the housing. It nevertheless entails a structural drawback which poses an obstacle to smooth assembly work in the course of manufacture.

This oil type damper has the soft flexible membrane of rich elasticity incorporated in the housing as nipped between the disk of the rotor and the braking disk coated on the opposite surfaces and the periphery with a layer of oil such as silicone grease. The flexible membrane is flat on the side opposed to the braking disk and is inwardly curved to form an annular depression on the side opposed to the disk of the rotor. Thus, it has an asymmetric structure with respect to the obverse and reverse sides thereof. The flexible membrane, during its insertion around the shaft of the rotor, gives rise to a problem of directionality. Because of the exacting work required for correct insertion, oil type dampers are quite frequently assembled in correctly with a consequent impairment of the operational efficiency of production.

OBJECT OF THE INVENTION

An object of this invention is to provide an oil type damper comprising a rotor formed of a braking disk contained in a housing and a shaft provided with a toothed wheel at the leading end thereof protruding from the housing and a flexible membrane for absorption of thermal expansion of oil interposed between the rotor and the housing, which oil type damper is so constructed as to facilitate the insertion of the flexible membrane during the assembly of the damper, improve the operational efficiency of the manufacture of the damper, enhance the sealing effect of the membrane, and eliminate the otherwise possible occurrence of incorrect assembly.

SUMMARY OF THE INVENTION

To accomplish the object described above, the oil type damper of this invention has a construction characterized by incorporating a flexible membrane for absorption of thermal expansion of oil as interposed between the inner wall surface of a housing and the braking disk of a rotor, providing the rotor with an integrally formed shaft radially diverged downwardly to the base thereof, and causing the flexible membrane intended for insertion around the diverged base of the rotor shaft to be formed in a shape substantially symmetrical relative to the obverse and reverse sides thereof.

Since the shaft of the rotor is provided with the downwardly diverged base and the flexible membrane is shaped substantially symmetrically with respect to the obverse and reverse sides thereof, the flexible membrane can be inserted around the shaft of the rotor without having to discriminate between the obverse and reverse sides of the flexible membrane because this membrane does not pose the problem of directionality in the course of insertion. This elimination of directionality results in removal of the cause for incorrect assembly of the damper and in enhancement of the operational efficiency of damper production. Further, the radially diverged base of the shaft of the rotor serves to enhance the degree of contact of the shaft with the flexible membrane and heighten the sealing property of the flexible membrane and, at the same time, bring about the effect of absorbing dimensional errors of the rotor and the flexible membrane which might otherwise occur during production.

BRIEF EXPLANATION OF THE DRAWINGS

The other objects and characteristic features of this invention will become apparent to those skilled in the art as the disclosure is made in the following description of a preferred embodiment of the invention, as illustrated in the accompanying drawings, wherein:

FIG. 1 is an exploded perspective view of a typical oil type damper as one embodiment of this invention.

FIG. 2 is a partially sectioned side view of the oil type damper of FIG. 1 in an assembled state.

FIG. 3 is a cross section of the rotor in the oil type damper of FIG. 1.

FIG. 4 is a cross section of the flexible membrane of the oil type damper of FIG. 1.

DESCRIPTION OF THE PREFERRED EMBODIMENT

The present invention will be described with reference to the accompanying drawings. An oil type damper 1 comprises a plastic base member 2 forming a tubular housing and a cap 3 adapted to fit in the base member 2. The base member 2 integrally comprises a bottom wall 4, a circular downwardly diverged thick-wall projection 5 extending outwardly in the axial direction from the center of the inner wall of the bottom wall 4, a tubular wall 6 extended outwarldy in the axial direction from the circumference of the bottom wall 4, and fitting pieces 7 elongated outwardly from the tubular wall 6 and adapted to be fastened to the machine on which the oil type damper is used. The inner wall surface of the tubular wall 6, in the most retired portion thereof, defines a shallow first receptacle 6a for receiving and holding a rotor 8 in intimate contact with the bottom wall 4 and, in the portion intervening between the first receptacle and the open surface, defines a slightly larger second receptacle 6b for receiving a flexible membrane 9 and a cap 3. The cap 3 has a thickness sufficient for the cap 3 to fit to the inner wall surface of the second receptacle 6b throughout the entire axial length thereof. The cap 3 is provided at the center on the outer surface thereof with a circular thick-wall part 10 protruding in the axial direction. This thick-wall part 10 has a central hole 11.

On the inner wall surface of the second receptacle 6b and on the outer wall surface of the cap 3 are provided a snap engaging device 12 which consists of an annular ridge 12a and an annular groove 12b adapted to come into mutual snap engagement when the cap 3 is driven into the inner wall surface of the second receptacle 6b so as to close the open surface of the tubular wall 6.

The rotor 8 possesses a braking disk 13 and a shaft 14 protruding from the center of one surface of the braking disk 13. This shaft 14 is passed from the interior of the cap 3 through the central hole 11 of the cap 3 and thrust out of the leading end of the thick-wall part 10, with a toothed wheel 15 fastened to the outer end of the shaft 14. The diameter of the braking disk 13 is slightly smaller than the inside diameter of the second receptacle 6b.

The braking disk 13 possesses four blades 13a radially extended from the shaft 14 to increase the torque for generating a large oil shearing area. The shape of the braking disk 13 is not limited to that which is illustrated. The braking disk 13 may be in the shape of a disk or may be provided with a plurality of radially disposed perforations or protuberances. Further, the braking disk 13 is provided, at the center on the surface opposite the surface supporting the shaft 14 in place, with a fitting hole 16 depressed inwardly in a shape matched to the contour of the projection 5 of the bottom wall 4 so as to prevent the shaft 14 of the rotor 8 from vibration in the lateral direction.

The shaft 14 has the outer surface of the portion thereof for insertion of the flexible membrane 9 radially diverged downwardly to form a flared part 17, into which the flexible membrane 9 is fitted. The external end part 14a of the shaft 14 is formed in an oval shape to prevent the toothed wheel 15 from producing idle rotation around the shaft 14.

The flexible membrane 9 is soft and elastic enough to alter its shape under the pressure of the oil generated when the oil undergoes thermal expansion. Thus, the flexible membrane 9 serves to absorb the voluminal expansion of the oil. The flexible membrane is formed in a small wall thickness with a material of small thermal deformation such as synthetic rubber or a flexible plastic substance like polyethylene or polypropylene. It is given flat obverse and reverse surfaces so as to possess a structure symmetrical with respect to the obverse and reverse sides. The flexible membrane 9 is provided at the center thereof with a circular opening 9a. In the opening 9a, there is formed an inner edge part 9b having a semicircular cross section such that the opening 9a is enabled to come into sealing contact with the flared part 17 of the shaft 14 and prevent the oil from spreading around the shaft 14 and leaking. The flexible membrane 9 is provided on the periphery thereof with an outer edge part 9c.

The outside diameter of the flexible membrane 9 is substantially equal to the inside diameter of the tubular wall 6. In the present embodiment, the flexible membrane is secured inside the housing by having the outer edge part 9c fitted into the second receptacle 6b of the tubular wall 6 and the cap 3 brought into snap engagement with the annular groove 12b and is kept at a distance from the surface 13b of the braking disk 13 through the medium of the second receptacle 6b and the flared part 17 of the shaft 14.

The toothed wheel 15 is provided at the center thereof with an insertion hole 15a of an oval cross section matched to the external end part 14a of the shaft 14 of the rotor 8.

The assembly of this damper 1 is accomplished by fitting the inner edge part 9b of the flexible membrane 9 around the flared part 17 of the shaft 14, inserting the shaft 14 from the inner side through the central hole 11 of the cap 3 until it emerges from the leading end of the thick-wall portion 10, applying oil 18 such as silicone grease on the braking disk 13, then inserting the braking disk 13 into the first receptacle 6a inside the tubular wall 6 of the base member 2 with the flexible membrane 9 fitted in the second receptacle 6b, accommodating the braking disk 13 and the flexible membrane 9 integrally inside the tubular wall 6 of the base member 2, and driving the cap 3 along the inner wall surface of the tubular wall 6. As a result, the cap 3 is secured to the base member 2 through the medium of the snap engaging device 12 to give rise to a complete housing. Subsequently, a toothed wheel 15 adapted to be meshed with a rack, a sector gear, or a toothed wheel to cooperate with a lid is fastened to the leading end of the shaft 14.

In the oil type damper so assembled, therefore, the rotor 8 is freely rotatably supported in place by the central hole 11 and the projection 5. This rotation of the rotor 8, however, is braked by the resistance offered by the viscosity of the oil 18 adhering to the braking disk 13 and filling up the gap defined by the bottom wall 4, the inner wall surface of the tubular wall 6, and the surface of the flexible membrane 9 opposed to the braking disk 13. The result is that the motion of an associated lid, cassette holder, ash tray or the like is damped. When the ambient temperature rises to cause voluminal expansion of the oil 18, the flexible membrane 9 is inflated in the direction of the cap 3 by the pressure of the expanding oil 18. Since this inflation of the flexible membrane 9 serves to absorb the thermal expansion of the oil 18, the oil 18 does not leak out of the housing.

For the purpose of preventing the toothed wheel 15 from producing an idle rotation about the shaft 14, the external end part 14a of the shaft 14 is formed in an oval shape and the toothed wheel 15 contains the insertion hole 15a of an oval cross section. Optionally, the cross section of the external end part 14a or the insertion hole 15a may be in the shape of the letter D or a polygon.

The damper 1 of the present invention comprises five component parts, i.e. the base member 2, the cap 3, rotor 8, the flexible membrane 9, and the toothed wheel 15. Of these component parts, the flexible membrane 9 and the toothed wheel 15 have no directionality in the axial direction, or with respect to the respective obverse and reverse sides thereof. Thus, the damper can be assembled more easily than the conventional oil type damper. The possibility of incorrect assembly is minimal and the productivity is notably improved.

Further, since the shaft 14 has the flared part 17 therein, it absorbs possible dimensional errors in the size of the opening 9a of the flexible membrane 9 and the contour of the shaft 14. As a result, the rigidity with which the dimensions of the rotor 8 and the flexible membrane 9 have to be controlled during their fabrication is reduced, lowering the unit price of such component parts. Since the inner edge part 9b of the flexible membrane 9 comes into intimate contact with the flared part 17, the damper enjoys an improved sealing effect.

Moreover, the fact that the rotor 8 is supported fast in place by the thick-wall part 10 of the cap 3 and the projection 5 of the bottom wall 4 prevents the rotor 8 from being vibrated in the axial direction and the braking force from being dispersed.

In accordance with the present invention, the shaft of the rotor contains the flared part and the flexible membrane formed in a shape asymmetrical with respect to the obverse and reverse sides thereof is inserted around this flared part as described above. Consequently, the flexible membrane does not pose the problem of directionality during its insertion around the shaft of the rotor. The oil type damper of this invention, therefore, simplifies the work of assembly, eliminates the possibility of occurrence of incorrect assembly, and enjoys notably improved productivity. The flared part serves to absorb dimensional errors of the rotor and the flexible membrane, reduce the required degree of size control for the component parts, lower the unit price of the component parts, and improve the sealing effect of the flexible membrane.

What is claimed is:

1. A rotary oil type damper, comprising: a housing; a rotor comprising a shaft having a leading end thereof extending out of said housing and provided at a basal portion thereof with a flared part radially diverged downwardly and a braking disk extending from said flared part and integrally formed with said shaft and accommodated within said housing; a centrally through apertured flexible membrane formed substantially symmetrically with respect to the observe and reverse sides thereof, inserted around said flared part of said rotor for sealing with the same, and positioned in said housing overlying but not normally contacting said braking disk; and a quantity of oil placed within said housing around said braking disk.

2. A damper according to claim 1, wherein an inner edge part of the through aperture of said flexible membrane has a semicircular cross section so as to sealingly engage said shaft while minimizing frictional engagement therebetween.

3. A damper according to claim 1, wherein said housing comprises a base member having an open-ended tubular hollow interior for receiving said braking disk portion and said flexible membrane therein and a cap adapted to engage an open end of said base member such that said flexible membrane is retained in place with an outer edge part thereof tightly engaged between said base member and said cap so as to form a seal for retaining the oil about the braking disk while permitting free rotation thereof as permitted by the viscosity of said oil.

4. A damper according to claim 3 wherein said tubular interior of said base member comprises a first tubular portion of a first diameter for receiving said braking disk portion therewithin and a second tubular portion of a second diameter greater than said first diameter for receiving said flexible membrane therein, said flexible membrane being of a diameter greater than said first diameter and the height of said first tubular portion being greater than the height of said braking member such that said flexible membrane is normally held out of engagement with said braking disk portion.

5. A damper according to claim 4 wherein said second tubular portion has a height greater than the height of a major portion of said flexible member, said flexible member including a peripheral axially bi-directionally outwardly extending rim portion of greater height than the height of said second tubular portion to be sealingly engaged between an inner surface of said cap and an annular shoulder defined between said first and second tubular portions.

* * * * *